US011042920B2

(12) United States Patent
Moudgil et al.

(10) Patent No.: US 11,042,920 B2
(45) Date of Patent: Jun. 22, 2021

(54) SYSTEM AND METHOD FOR DYNAMICALLY DISPLAYING RECOMMENDED DIGITAL PRINT PRODUCTS ON A COMPUTER USER INTERFACE

(71) Applicant: FUJIFILM North America Corporation, Valhalla, NY (US)

(72) Inventors: Vibhaker Moudgil, Rochester, NY (US); Michael Grover, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 286 days.

(21) Appl. No.: 15/847,208

(22) Filed: Dec. 19, 2017

(65) Prior Publication Data
US 2019/0188765 A1    Jun. 20, 2019

(51) Int. Cl.
G06Q 30/00    (2012.01)
G06Q 30/06    (2012.01)

(52) U.S. Cl.
CPC ..... *G06Q 30/0621* (2013.01); *G06Q 30/0625* (2013.01); *G06Q 30/0631* (2013.01)

(58) Field of Classification Search
None
See application file for complete search history.

(56) References Cited

U.S. PATENT DOCUMENTS

| | | | | |
|---|---|---|---|---|
| 2003/0050815 A1* | 3/2003 | Seigel | ............... | G06Q 30/0613 705/26.41 |
| 2004/0172325 A1* | 9/2004 | Blanco | ................. | G06Q 30/02 705/14.4 |
| 2013/0173414 A1* | 7/2013 | Page | .................. | G06Q 30/0621 705/26.5 |
| 2015/0161674 A1* | 6/2015 | Khoury | .................. | H04L 51/10 705/14.66 |
| 2016/0140491 A1* | 5/2016 | Forgatch | .............. | G06Q 10/087 705/7.29 |
| 2016/0275585 A1* | 9/2016 | Scoggins | ........... | G06Q 30/0621 |

OTHER PUBLICATIONS

Vibhaker (Victor) Moudgil, Towards an Understanding of Recommender Systems: Callobrative, Case-Based, & Software Agents; Nov. 23, 2003.

* cited by examiner

*Primary Examiner* — Mila Airapetian
(74) *Attorney, Agent, or Firm* — Woods Oviatt Gilman LLP; Dennis B. Danellla, Esq.

(57) ABSTRACT

A system and method for dynamically displaying a digital representation of one or more recommended print products on a user interface of a computing device is provided. The method comprises providing a digital representation of each of a plurality of print products stored in a computer memory, wherein the plurality of print products are categorized into at least one of a plurality of print product groups that include a first print product group; identifying a geographic location or a time of year; selecting the first print product group using the processor of the computing device, wherein the first print product group is selected based on the identified geographic location or time of year; and displaying the digital representations corresponding to at least one of the plurality of print products included within the first print product group on the user interface. Other aspects are also disclosed.

30 Claims, 14 Drawing Sheets

SYSTEM AND METHOD FOR DYNAMICALLY DISPLAYING RECOMMENDED DIGITAL PRINT PRODUCTS ON A COMPUTER USER INTERFACE

FIELD OF THE INVENTION

The present invention is directed to a system and method for dynamically displaying recommended print products on a computer interface; in particular, the method and system is configured for automatically determining the type of print products to display to a user of a computing device, such as a photo kiosk, based on at least one of a provided geographic location, a time of year, digital image metadata, or the user's interaction with the displayed print products.

BACKGROUND OF THE INVENTION

The popularity of online shopping has grown exponentially over the past two decades. Using a smartphone, laptop, tablet, or desktop computer, consumers have access to a wide variety of goods and services through the Internet. When looking for a product that may be of interest, the consumer can either go directly to a website of a vendor of such product, or use a shopping search engine that operates to display the product and pricing offered by multiple vendors for comparison shopping. It is not uncommon for the consumer to have a general idea of what he wants to purchase, while not having a specific product identified prior to commencing an online search. The consumer in this instance could decide to manually browse a list of all relevant products available for purchase until a desired product is identified. The consumer could also locate a desired product by refining the list of relevant products being displayed by manually applying a filter specifying one or more characteristics that are desired in the product, such as, but not limited to, color, material, size, price, etc. By narrowing down the list of products that are being displayed to those that have desired characteristics, the consumer is able to more efficiently locate a desired product, thereby making the purchase of a product more likely.

Instead of relying on the consumer to manually search and filter a list of products to locate a product that may be of interest, an Internet-based big data analytics engine (i.e., recommender system) may be used in conjunction with either an individual website or a shopping search engine. A recommender system may be in the form of a software application that is configured to identify and/or display one or more products that the customer may be interested in purchasing.

One type of recommender system is a case based reasoning (CBR) system. A CBR system begins by offering a suggestion of a product or class of products for which the customer is requesting a recommendation. After the customer reviews the suggested products, the customer can select additional variables that are of interest. This refinement of the suggested products using additional variables may result in a new suggested group of products that are displayed to the customer. This process may continue until the customer identifies a product of interest or ends the search. One feature of the CBR system is that it does not require a database that stores customer preferences, but instead relies upon the customer critiquing the original and any subsequently suggested products by selecting additional variables of interest. The suggested product offerings are generated using an algorithm based on similarities between the critiqued product offering and a knowledge-base of previous cases that are similar, wherein a similarity index is used to produce a new group of suggested products that is most similar to the critiqued product selection. The CBR system is essentially a comparative scheme that requires that a relatively large number of previous cases be provided so that when a new product recommendation is requested, it can locate an existing case that is similar.

Another type of recommender system is a collaborative recommender system (CRS) that is configured to use a customer's individual preferences and purchasing habits in a particular area of interest to recommend one or more products. The CRS obtains a consumer's preferences and purchasing habits by requiring the customer to provide their likes and dislikes by either responding to a questionnaire or reading various passages and providing a response on a numbered or colored rating scale. The CRS stores the information collected from the customer and compares the information with other customers with similar preferences and purchasing habits to recommend products to a consumer. While the CRS is generally able to provide good product recommendations to a consumer, it requires that the consumer commit a fair amount of time to answer each of the preference and purchasing habit questions before the CRS can recommend products.

Recommender systems may also take the form of an agent-based recommender system (ARS). An ARS utilizes a software agent that may be configured for searching and filtering through information contained on the Internet to provide personalized recommendations based on purchase criteria provided by the consumer. ARS can be customized to meet the needs of a consumer, and can be used in a continuous manner to provide recommendations throughout a given time period. For example, in a situation where a person is seeking a job, a software agent can be used to continuously search for available jobs in certain job categories using key words, and communicate the results back to the person at pre-determined time intervals. ARS is beneficial in that it automates an Internet search and avoids repeated searches for the same criteria. However, a high level of knowledge engineering may be required to develop the taxonomy for the data, and therefore may be time consuming to develop.

Accordingly, what is needed is an improved system and method for dynamically recommending products to a user based on usage analytic data and/or real-time events of the product ordering system. The present invention fills this need as well as other needs.

SUMMARY OF THE INVENTION

One aspect of the present invention is directed to a method programmed for execution in a computing environment for dynamically displaying a digital representation of one or more recommended print products on a user interface of a computing device for review and selection by a user. The method comprises: a) providing a digital representation of each of a plurality of print products stored in a computer memory, wherein the plurality of print products are categorized into at least one of a plurality of print product groups, wherein the plurality of print product groups includes a first print product group; b) identifying a geographic location or a time of year using a processor of a computing device; c) selecting the first print product group from the plurality of print product groups using the processor of the computing device, wherein the first print product group is selected based on the identified geographic location or the identified time of year; and d) displaying the digital representations corresponding to at least one of the plurality of print products included within the first print product group on a user interface of the computing device.

In the method set forth above, the geographic location may be either associated with the computing device or inputted by a user using the user interface, and, the geographic location may be at least one of a country, region of a country, State, zip code, or a mailing address. Also, the digital representations corresponding to at least one of the plurality of print products included within the first print product group may be displayed on the user interface in a first format, wherein the first format is dependent upon the identified geographic location. The first format may include a size that the digital representations corresponding to at least one of the plurality of print products included within the first print product group are displayed on the user interface. Further, the step of displaying the digital representations corresponding to at least one of the plurality of print products included within the first print product group may further include displaying text in association with the digital representations corresponding to at least one of the plurality of print products included within the first print product group, wherein the first format includes a language of the text, wherein the language of the text is dependent upon the identified geographic location. The first format may also include an arrangement of the digital representations corresponding to at least one of the plurality of print products included within the first print product group displayed on the user interface.

The method above may further comprise the steps of providing for at least one digital image; and displaying the at least one digital image in association with each of the digital representations corresponding to the at least one of the plurality of print products included within the first print product group that are displayed on the user interface. The step of providing the at least one digital image may include storing the at least one digital image in the computer memory. The computer memory may either be provided by the computing device, or provided by a server that is in communication with the computing device over a wired or wireless network. The at least one digital image may be stored in the computer memory using an external computing device that is in communication with the computing device or the server over the network, wherein the external computing device is one of a mobile computing device or a remote computing device.

In the method set forth above, the at least one digital image may include associated metadata, and the step of selecting the first print product group from the plurality of print product groups using the processor of the computing device may be based on the identified geographic location, the identified time of year, or the associated metadata. Further, the associated metadata may include information related to at least one of a source of the at least one digital image; a size of a file associated with the at least one digital image; an identification of the digital representations that the at least one digital image was associated with; a date that the file associated with the at least one digital image was created; an identification of a device that created the file; or an identification of at least one item of interest included in the at least one digital image. The at least one item of interest may be related to a scene depicted in the at least one digital image, wherein the scene can be at least one of an indoor scene, an outdoor scene, a particular season of the year, or an identifiable landmark. The at least one item of interest may also include an identification of whether the at least one item of interest is a human or an animal, and a further determination of an age and a gender of the at least one item of interest.

The method set forth above may further include the steps of allowing for the selection of at least one of the displayed digital representations corresponding to the at least one of the plurality of print products included within the first print product group; and establishing a print product order using the processor, wherein the print product order includes the selected digital representations corresponding to the at least one of the plurality of print products included within the first print product group. In addition, the method may further comprise the step of producing a print product corresponding to the selected digital representations included within the print product order. The print product order may include order metadata, wherein steps a)-d) are repeated, and wherein the subsequent selecting of the first print product group is at least in part based on the order metadata. The order metadata may include at least one of an identification of the at least one digital representations corresponding to the selected digital representations included within the print product order; or a price of the selected digital representations included within the print product order.

In another aspect, the method set forth above may also provide for the selection of the first print product group from the plurality of print product groups using the processor of the computing device based on a surname provided by a user of the computing device, wherein the surname is identified with a particular country of origin, ethnic group of people, or religion and the first print product group is associated with the identified country of origin.

In yet another aspect, the method set forth above may also provide for accessing the computing device through a website over a network (e.g., Internet), wherein the selection of the first print product group from the plurality of print product groups using the processor of the computing device based on an identification of a country of origin of the website, and wherein the first print product group is associated with the identified country of origin of the website.

In another aspect, the method set forth above may be embodied in computer readable instructions stored on a non-transitory computer readable medium.

In yet another aspect, the present invention may be directed to a computer system for dynamically displaying a digital representation of one or more recommended print products. The system comprises a computer memory, a processor, and a user interface. The computer memory includes a print product recommendation module and a digital representation of each of a plurality of print products stored therein. The print product module allows for the identification of a geographic location or a time of year, wherein the plurality of print products are categorized into at least one of a plurality of print product groups, and wherein the plurality of print product groups includes a first print product group. The processor is configured for being used in conjunction with the print product recommendation module to select the first print product group from the plurality of print product groups based on the identified geographic location or the identified time of year. The user interface is configured for displaying the selected digital representations corresponding to at least one of the plurality of print products included within the first print product group.

In the system described above, the user interface may be included in a photo kiosk, and the computer memory may be included in either the kiosk or a server that is in communication with the kiosk over a network. The system may further comprise an external computing device that is in communication with the computer memory over a network, wherein the external computing device is configured for communicating the at least one digital image to the computer memory. The system may further comprise a product fulfillment module is that configured for allowing for the selection of at least one of the displayed digital representations corresponding to the at least one of the plurality of print products included within the first print product group; and establishing a print product order, wherein the print product order includes the selected digital representations corresponding to the at least one of the plurality of print products included within the first print product group. The system may further comprise a fulfillment device that is configured for producing a print product corresponding to the selected digital representations included within the print product order.

In another aspect, the present invention may be directed to a computer-implemented method programmed for execution in a computing environment, comprising the steps of: a) providing a digital representation of each of a plurality of print products stored in a computer memory, wherein the plurality of print products are categorized into at least one of a plurality of print product groups, and wherein the plurality of print product groups includes a first print product group; b) selecting the first print product group from the plurality of print product groups using a processor of a computing device, such as a kiosk; c) displaying the digital representations corresponding to a first set of print products included within the first print product group on a user interface of the computing device; determining an amount of time that the digital representations corresponding to the first set of print products is displayed on the user interface of the computing device, wherein if the amount of time is equal to or greater than a predetermined time threshold, then the method further comprises the step of automatically displaying the digital representations corresponding to a second set of print products included within the first print product group on the user interface of the computing device.

In another aspect of the method, the plurality of print product groups may include a second print product group, and the method may further comprise the steps of: selecting the second print product group from the plurality of product groups using the processor of the computing device; displaying the digital representations corresponding to a first set of print products included within the second print product group on the user interface of the computing device; determining, utilizing the processor, that the digital representations corresponding to the first set of print products included within the second print product group have been displayed on the user interface of the computing device, and automatically displaying on the user interface the digital representations corresponding to a recommended print product group from the plurality of product groups utilizing the processor of the computing device.

In yet another aspect, the method described above may further comprise the steps of: allowing the user to select any of the displayed digital representations corresponding to the first set of print products included within the first print product group using the user interface to view product information related to the selected digital representation; and determining, utilizing the processor, a number of times that the user selects each of the displayed digital representations corresponding to the first set of print products included within the first print product group, wherein if the number of times for any of the displayed digital representations is equal to or greater than a predetermined selection threshold, then the method further comprises the step of automatically displaying the digital representations corresponding to a third set of print products included within the first print product group on the user interface of the computing device. The product information may include at least one of a price of the selected digital representation or a written description of the selected digital representation. It is contemplated that the third set of print products is the same as the second set of print products. It is also contemplated that the the third set of print products includes at least one of the first set of print products.

A further discussion of the details and benefits of the above-described aspects are set forth below.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawings, wherein.

DETAILED DESCRIPTION OF THE INVENTION

Figure 1:
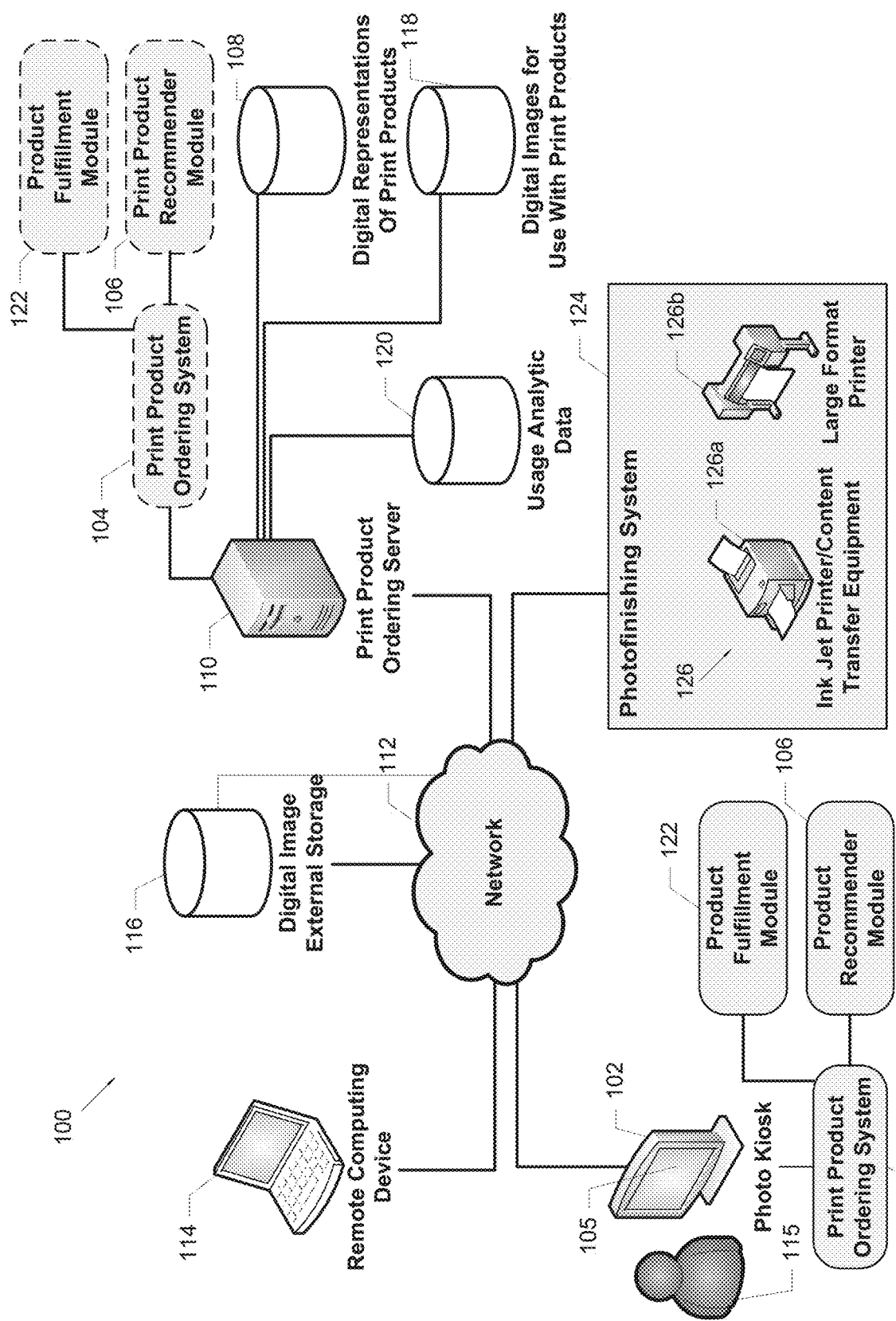
FIG. 1 is a schematic diagram showing an exemplary system that may be used with any of the methods in accordance with one aspect of the present invention.

Referring to the drawings in detail, with particular reference to FIG. 1, one aspect of the present invention includes a system 100 that may be used to dynamically display a digital representation of one or more recommended print products in accordance with the aspects of the present invention. The system 100 creates an intelligent display and ordering workflow that changes behavior automatically based on various analytics discovered in the usage analytic data and real-time events of the system. The aspects of the present invention will be discussed in more detail below.

System 100 comprises one or more computing devices 102, such as a photo kiosk, that includes a print product ordering system 104 in the form of computer executable instructions configured for displaying and allowing for the selection of one or more digital representations of print products on a user interface 105 of kiosk 102. In accordance with an aspect of the present invention, print product ordering system 104 includes a product recommender module 106 that uses computer-executable instructions in conjunction with a processor to dynamically display digital representations of recommended print products on user interface 105 of kiosk 102, which will be described in more detail below. The digital representations of recommended print products may be stored in a memory 108 of a server 110 that is communication with the kiosk 102 through a network 112. The digital representations of recommended print products may be retrieved by kiosk 102 as needed when they are to be displayed on user interface 105 of kiosk 102. Network 112 may be any type of network, such as a wide area network or local area network through a wired or wireless connection.

Print product ordering system 104 may also be configured to associate at least one digital image 113 with the digital representations 300a-j of the print products 302 (FIGS. 3, 4 and 9) that are displayed on user interface 105 of kiosk 102. The association of the digital image and the digital representations of the print products provides a user 115 with a visual representation of how such a digital image will look on a print product if it were ordered and produced. System 100 allows for the digital images to be transferred to kiosk 102 using an external memory device, such as a thumb drive, or uploaded from a remote computing device 114 through network 112, or uploaded from an external storage location 116, such as a social media website (e.g., INSTAGRAM® and PHOTO®) or cloud-based memory location, using kiosk 102 or external computing device 114. Remote computing device 114 may be any type of computing device, such as, but not limited to, a desktop computer, smartphone, tablet, or other mobile computing device that is capable of transferring a digital image to kiosk 102. After the digital images are transferred to kiosk 102, the digital images may be stored locally in the memory of kiosk 102 or in a memory 118 in server 110. Server 110 may also include a memory 120 for storing analytic data based on the usage of the system 110 by user 115.

Print product ordering system 104 may further include a product fulfillment module 122 that uses executable instructions to allow user 115 to request that a selected print product be produced by kiosk 102, or a photofinishing system 124 that is in communication with kiosk 102 over network 112. In particular, fulfillment module 122 communicates with one or more photofinishing devices 126 that are configured for producing the selected print product that incorporates the uploaded digital image. A print product can be any type of good or electronic product that has the digital image printed or displayed thereon, such as, for example, photographic print, photo book, calendar, mug, poster, T-shirt, sweatshirt, gift card, canvas print, mouse pad, picture frame, blanket, water bottle, and the like. Given the wide variety of print products that may be produced, system 100 may include a plurality of different types of photofinishing devices capable of producing such print products, such as, but not limited to, an ink jet printer/content transfer equipment 126a or a large format printer 126b for large items such as a poster. Photofinishing devices 126 may be physically located in a single physical location, such as a fulfillment center (e.g., retail/drug store) or in different physical locations, and may be in communication with each other through network 112.

It should be understood that print product ordering system 104, product recommender module 106 and product fulfillment module 122 may be stored in a memory of kiosk 102, and/or in server 110 that is in communication with kiosk 102 over network 112. Modules 106, 122 are not limited to any specific hardware or software configuration, but may rather be implemented as computer executable instructions in any computing or processing environment, including in digital electronic circuitry or in computer hardware, firmware, device driver, or software.

Figure 2:
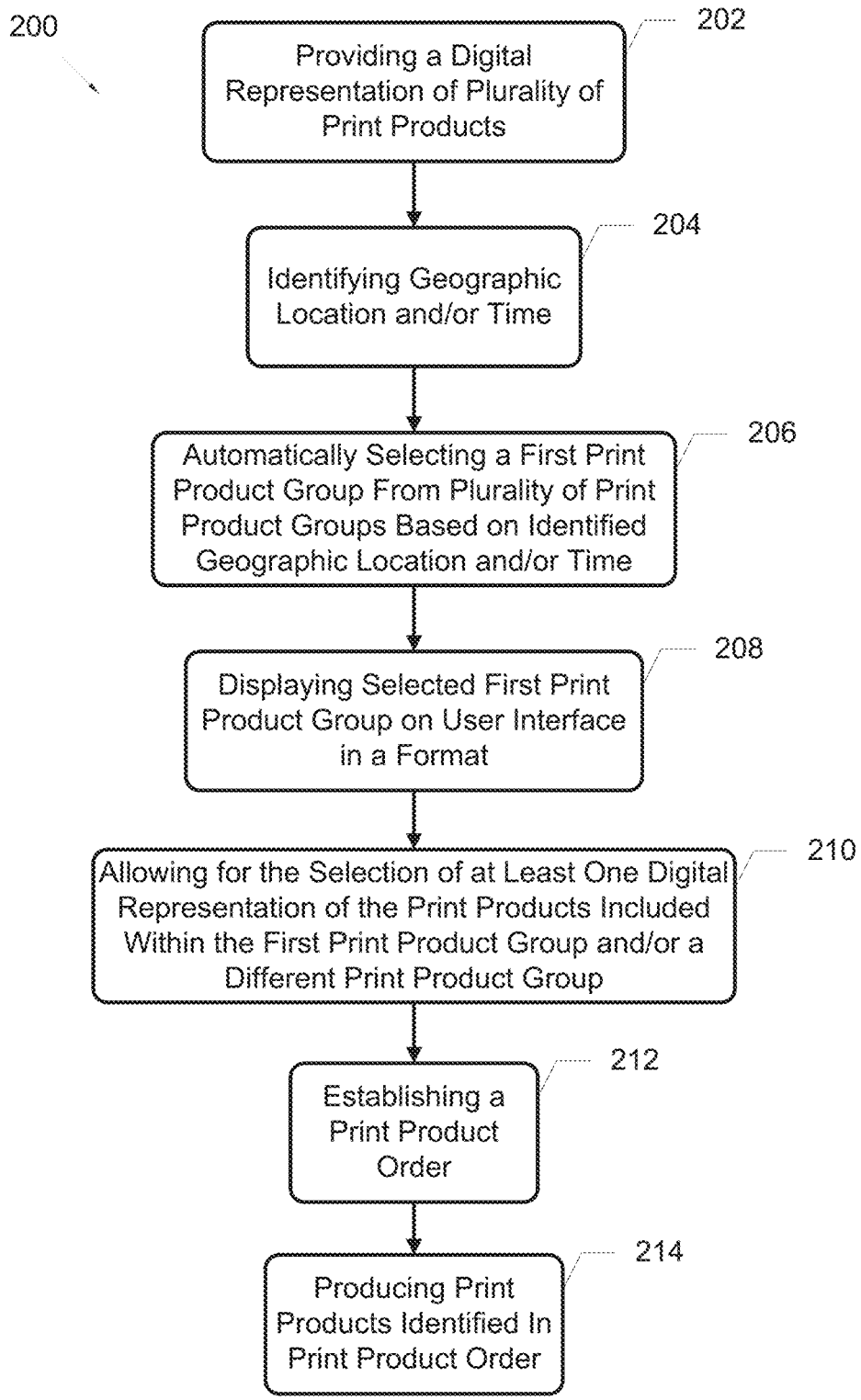
FIG. 2 is a flow diagram showing an embodiment of a method for dynamically displaying digital representations of print products on a user interface of a computing device.
Figure 3:
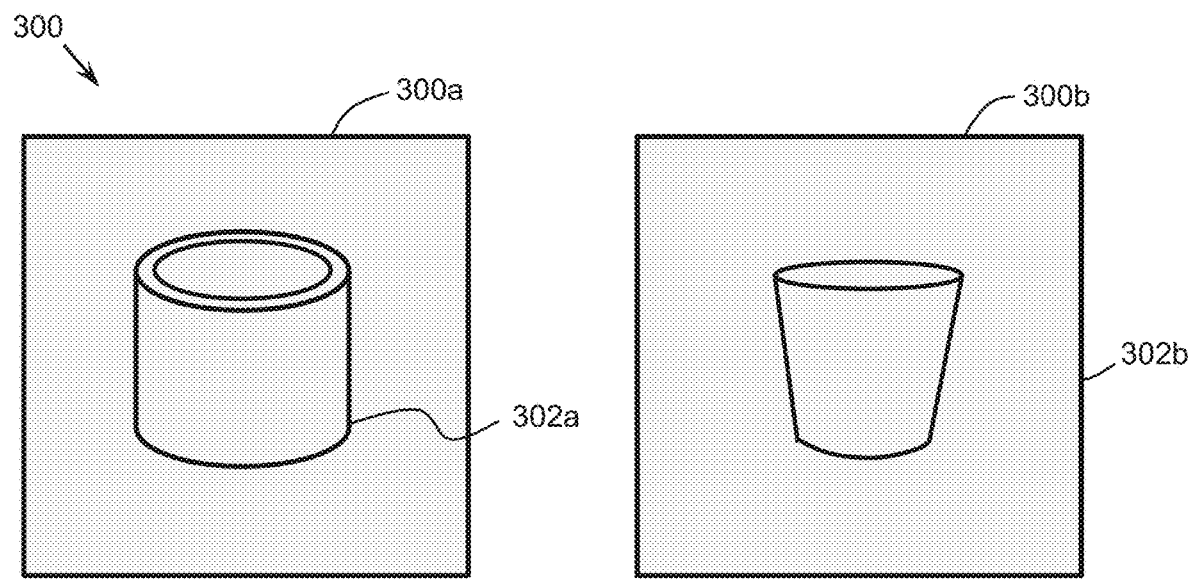
FIG. 3 is an exemplary illustration of digital representations of a corresponding number of print products.
Figure 4:
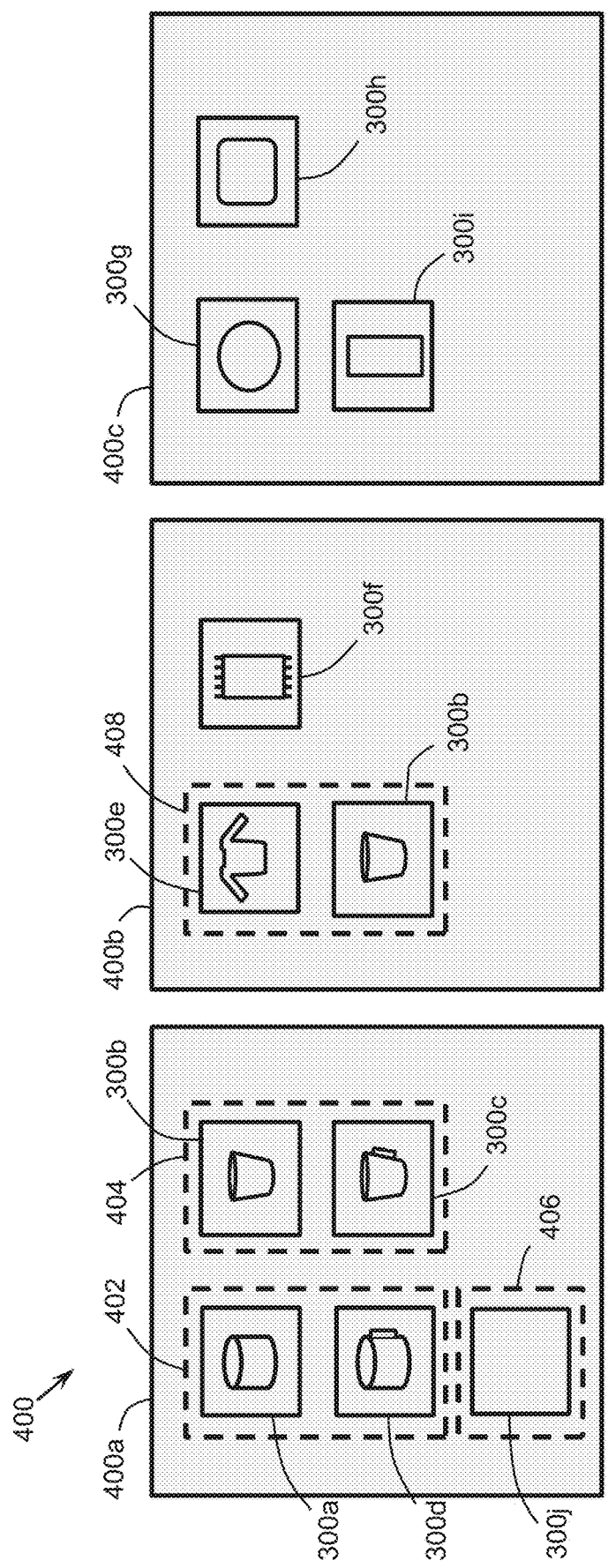
FIG. 4 is a exemplary illustration of organizing a plurality of digital representations of print products that can be dynamically generated and organized into a plurality of print product groups.

FIG. 2 is a flow diagram showing an exemplary method 200 that may be implemented using system 100 in accordance with one aspect of the present invention. In particular, as previously mentioned, method 200 is computer-implemented and programmed for execution in a computing environment for dynamically displaying a digital representation of one or more recommended print products on user interface 105 of kiosk 102 for review and selection by user 115. With additional reference to FIG. 3, method 200 comprises a step 202 of providing a digital representation 300 of each of a plurality of print products 302 stored in memory 108 or a memory of kiosk 102. For example, FIGS. 3 and 4 show digital representations 300a-j of corresponding print products (only 302a and 302b shown in FIG. 3). As best seen in FIG. 4, plurality of print products 302, and therefore corresponding digital representations 300, may be categorized into a data structure including at least one of a plurality of print product groups 400, namely, a first print product group 400a, a second print product group 400b, and a third print product group 400c. It should be understood that the print products may be categorized into any number of print product groups, wherein any number of print products may be included in each print product group. For example, the first second and third print product groups 400a-c may be coffee mugs, beach wear, and magnets, respectively. Further, the data structure may further provide for the print products set forth in each of the product groups 400 to be sub-divided up into two or more different sets (e.g., sets 402, 404, 406). For example, the different sets 402, 404, 406 may be established because of the display limitations imposed by user interface 105 on kiosk 102. User interface 105 may only be able to display a certain number of digital representations of the print products at a time based on the size and format of the displayed digital representations, so the print product groups 400a, 400b, 400c may be sub-divided into different sets.

Figure 5:
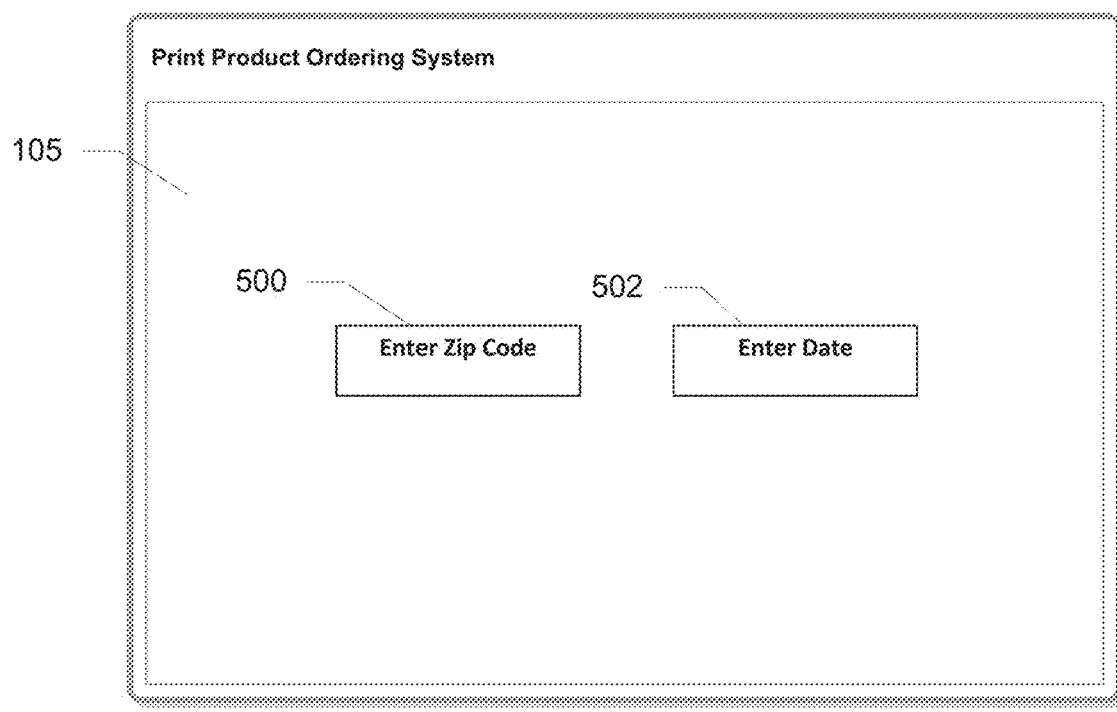
FIG. 5 is an exemplary screen shot of a user interface showing an optional input field for a geographic location and/or a time.

With reference to FIG. 2, method 200 further includes identifying at least one of a geographic location and/or a time, at step 204. The identification of the geographic location may be provided in a number of different ways utilizing one or more of the computing devices set forth in system 100. For example, the geographic location utilized in the method may be the particular geographic location of kiosk 102, which is stored in the memory of kiosk 102 or server 110. In another example, the geographic region utilized in the method may be obtained by analyzing or otherwise obtaining the geographic information (e.g. zip code) based on the IP address of kiosk 102 or remote computing device 114. In a further example, the geographic location utilized in the method may be inputted into a geographic location data field 500 by user 115 on user interface 105 of kiosk 102, as best seen in FIG. 5. The present invention also contemplates providing the geographic location in any other manner utilizing any of the computing devices set forth in system 100. It should be understood that the geographic location includes, but is not limited to, at least one of a country, region of a country, State, zip code, a mailing address, or other geographic coordinates.

As mentioned above, method 200 also may include the identification of a time at step 204, which may be a time of year including a day, month, year, season, and/or some other specified time. The identification of the time may be provided in a number of different ways utilizing one or more of the computing devices set forth in system 100. For example, the identification of the time may be automatically determined using an internal clock of kiosk 102, remote computing device 114, or server 110 based on the current time that the kiosk 102 or remote computing device 114 is being used by user 115. In another example, the time utilized by method 200 may be inputted into a time data field 502 or drop down menu by user 115 on user interface 105. The present invention also contemplates providing the time in any other manner utilizing any of the computing devices set forth in system 100.

It should be understood that criteria other than geographic location and/or time may be used to select the first print product group. For example, method 200 may also provide for the selection of the first print product group from the plurality of print product groups using print product ordering system 104 based on a surname provided by user 115 of kiosk 102, 114, wherein the surname is identified with a particular country of origin, ethnic group of people, or religion and the selected first print product group is associated with the identified country of origin. In yet another example, method 200 may also provide for accessing print product ordering system 104 through a website over network 112, wherein the selection of the first print product group from the plurality of print product groups is based on an identification of a country of origin of the website, and wherein the first print product group is associated with the identified country of origin of the website.

Referring back to FIG. 2, method 200 further includes utilizing product recommender module 106 to select first print product group 400a from plurality of print product groups 400 using the processor of kiosk 102 at step 206, wherein first print product group 400a is selected based on the identified geographic location, identified time, and/or any of the other criteria mentioned above. In other words, product recommender module 106 is used to select print products that correlate or are associated with a particular geographic location or time so that the print products are not randomly presented to user 115 of kiosk 102, but are instead are relevant to the particular situation. For example, if the geographic location of kiosk 102, or the geographic location inputted into geographic location data field 500, is associated with a beach or resort location, then the print product group that is selected in method 200 would be print products that would be of interest to a person located at the beach, such as, but not limited to, towels, frisbees, water bottles, picture frames with a beach theme, etc. In another example, if the geographic location of kiosk 102 or the geographic location inputted into geographic location data field 500 is associated with a retirement community, then the print product group that is selected in method 200 would be print products of interest to people that are older in age, such as, but not limited to, coffee mugs, calendars, etc. In yet another example, if a current time or a time inputted into time data field 502 is associated with a season of the year, such as winter, then the print product group that is selected in method 200 may include cold weather items, such as, but not limited to, blankets, sweatshirts, etc. Thus, it can be seen that product recommender module 106 is configured for dynamically selecting a print product group to be displayed on user interface 105 depending on an identified geographic location and/or an identified time, providing a customized presentation of the print products to user 115. Each of the aforementioned geographic location and time may be stored in memory 120 for each specific user so it can be used in subsequent interactions with print product ordering system 104.

Figure 6A:
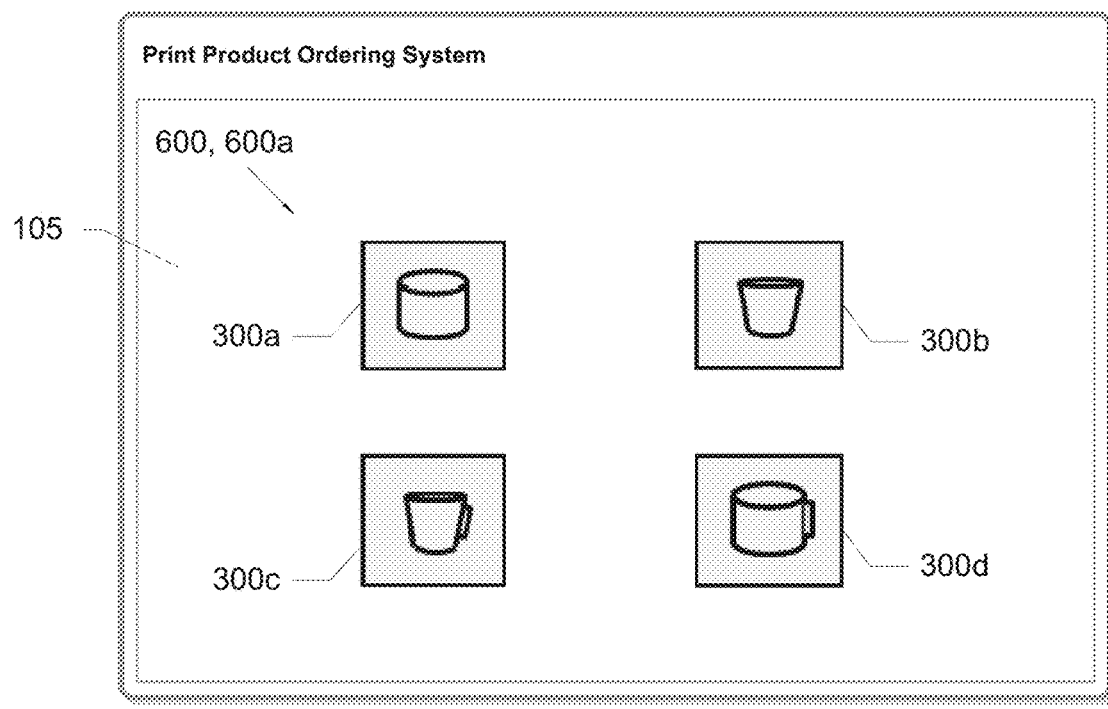
FIG. 6A is an exemplary screen shot of a user interface showing digital representations of a print product in a format.
Figure 6B:
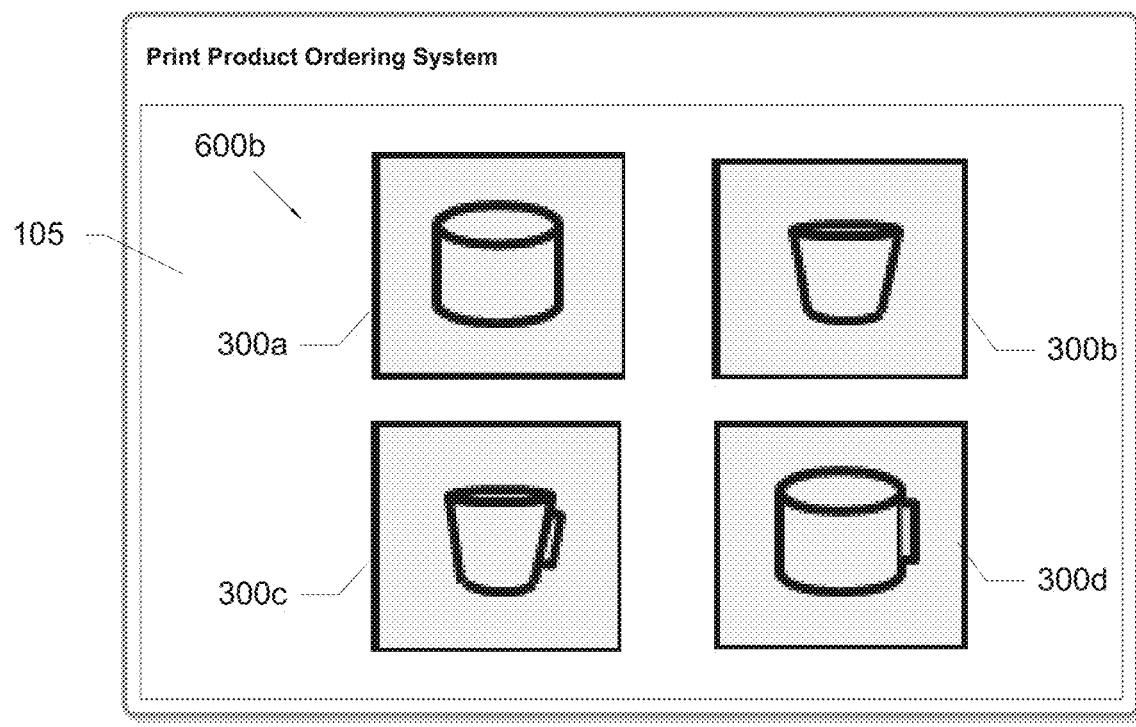
FIG. 6B is an exemplary screen shot of a user interface showing digital representations of a print product in an enlarged format.
Figure 6C:
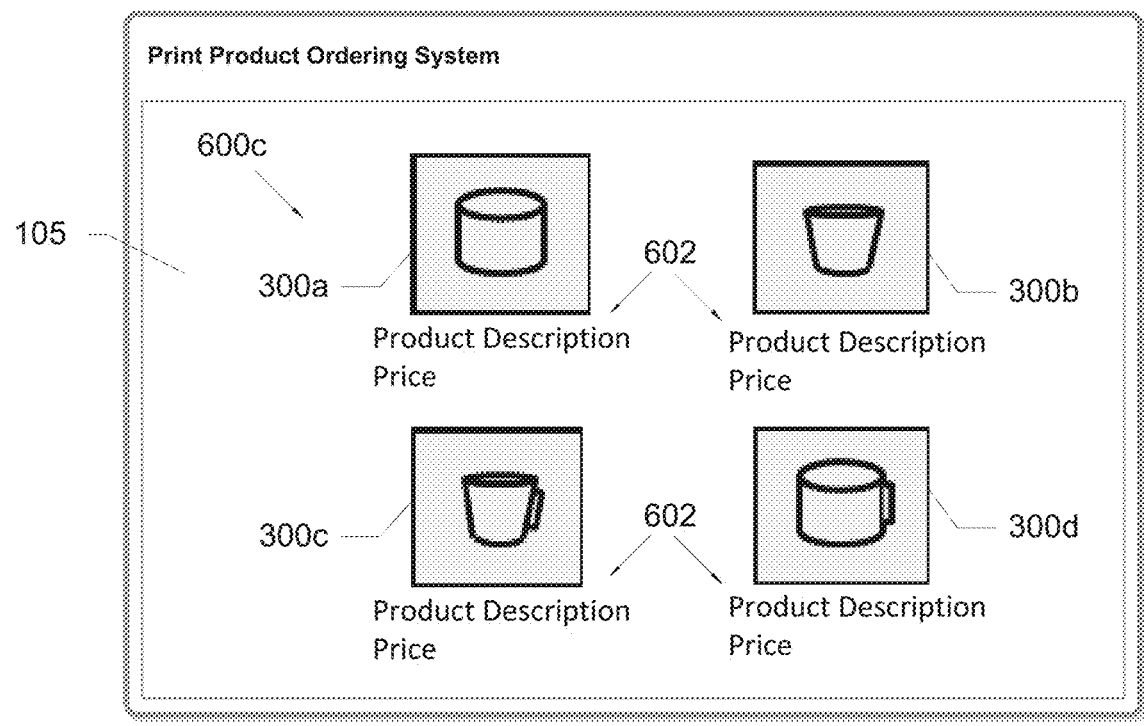
FIG. 6C an exemplary screen shot of a user interface showing digital representations of a print product in a format including a product description and price.
Figure 6D:
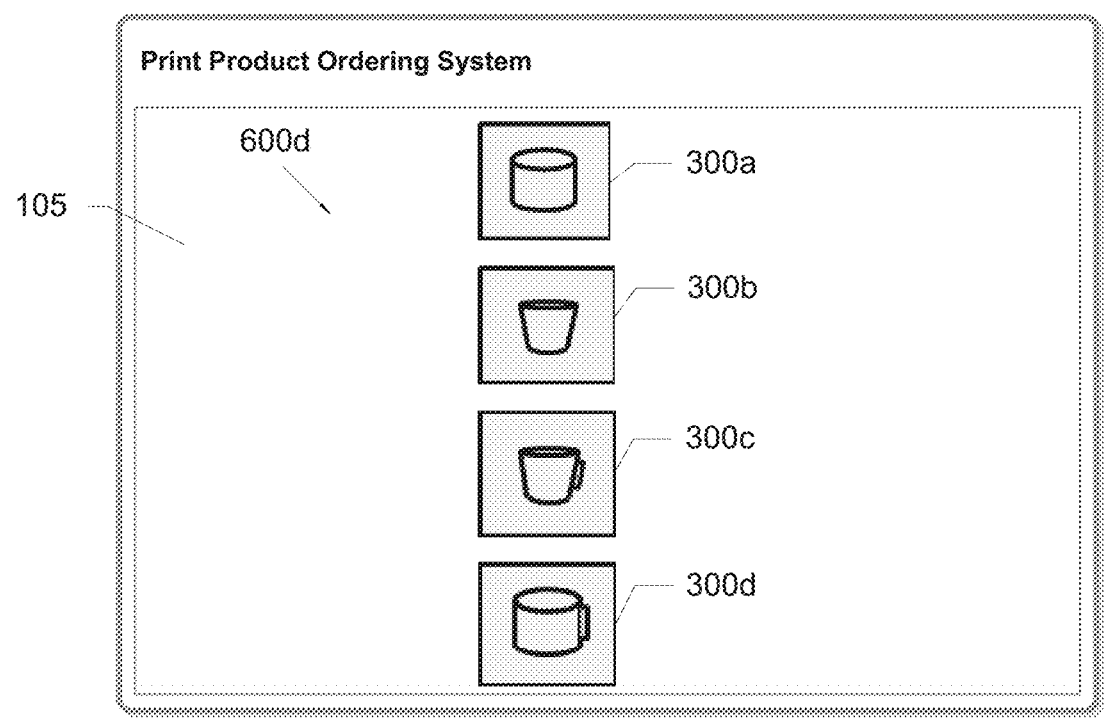
FIG. 6D an exemplary screen shot of a user interface showing digital representations of a print product in a format including an alternative arrangement.

After first print product group 400a is selected from plurality of print product groups 400, at step 208, recommender module 106 is configured for displaying the digital representations corresponding to at least one of the plurality of print products 300a-j included within first print product group 400a on user interface 105 of kiosk 102, as best seen in FIG. 2. As best seen in FIG. 6A, in one aspect, the digital representations 300a-d of the print products in first print product group 400a may be displayed on user interface 105 in a format 600 that is dependent upon the identified geographic location. For example, format 600a may include a size (e.g., peripheral dimensions, shape, area) that the digital representations 300a-d are displayed on user interface 105. For example, if the identified geographic location includes or is associated with a retirement community, then recommender module 106 may operate to enlarge the size of digital representations 300a-d from thumbnail to full view to provide for format 600b, which would make it easier for user 115 to view digital representations 300a-d on user interface 105, as best seen in FIG. 6B. It is also contemplated, as best seen in FIG. 6C, that the display of the digital representations 300a-d may include displaying text 602 (e.g., description of displayed print product, price) in association with digital representations 300a-d, wherein format 600c includes a language of the text 602. Recommender module 106 may be configured to change the language of text 602 depending upon the identified geographic location. For example, if the identified geographic area is associated with a population of people that speaks French, then recommender module 106 may be configured to display text 602 in the French language. Further, as best seen in FIG. 6D, format 600d may include an arrangement of digital representations 300a-d to optimize the visual appearance and presentation of the print products being displayed to user 115 of kiosk 102. The arrangement may include the order and/or placement of digital representations 300a-d on under interface 105.

Method 200 may further utilize print product ordering system 104 to allow user 115 to select at least one of the displayed digital representations 300a-d using user interface 105 at step 210. For example, user 115 can use a finger to touch at least one of the displayed digital representations 300a-d to indicate that the user would like for the selected items to be produced and made available to user 115. After at least one of the displayed digital representations 300a-d are selected by user 115, product fulfillment module 122 is configured for electronically receiving payment from user 115 and establishing a print product order using the processor of kiosk 102 or server 110, at step 212. The print product order includes order metadata that includes at least one of an identification of the selected digital representations corresponding to the selected digital representations included within the print product order, and a price of the selected digital representations included in the print product order. The print product order is communicated to photofinishing system 124 over network 112 so that the print products identified in the print product order are fulfilled by the appropriate photofinishing device 126 at step 214 and made available to user 115 that placed the order.

Figure 7:
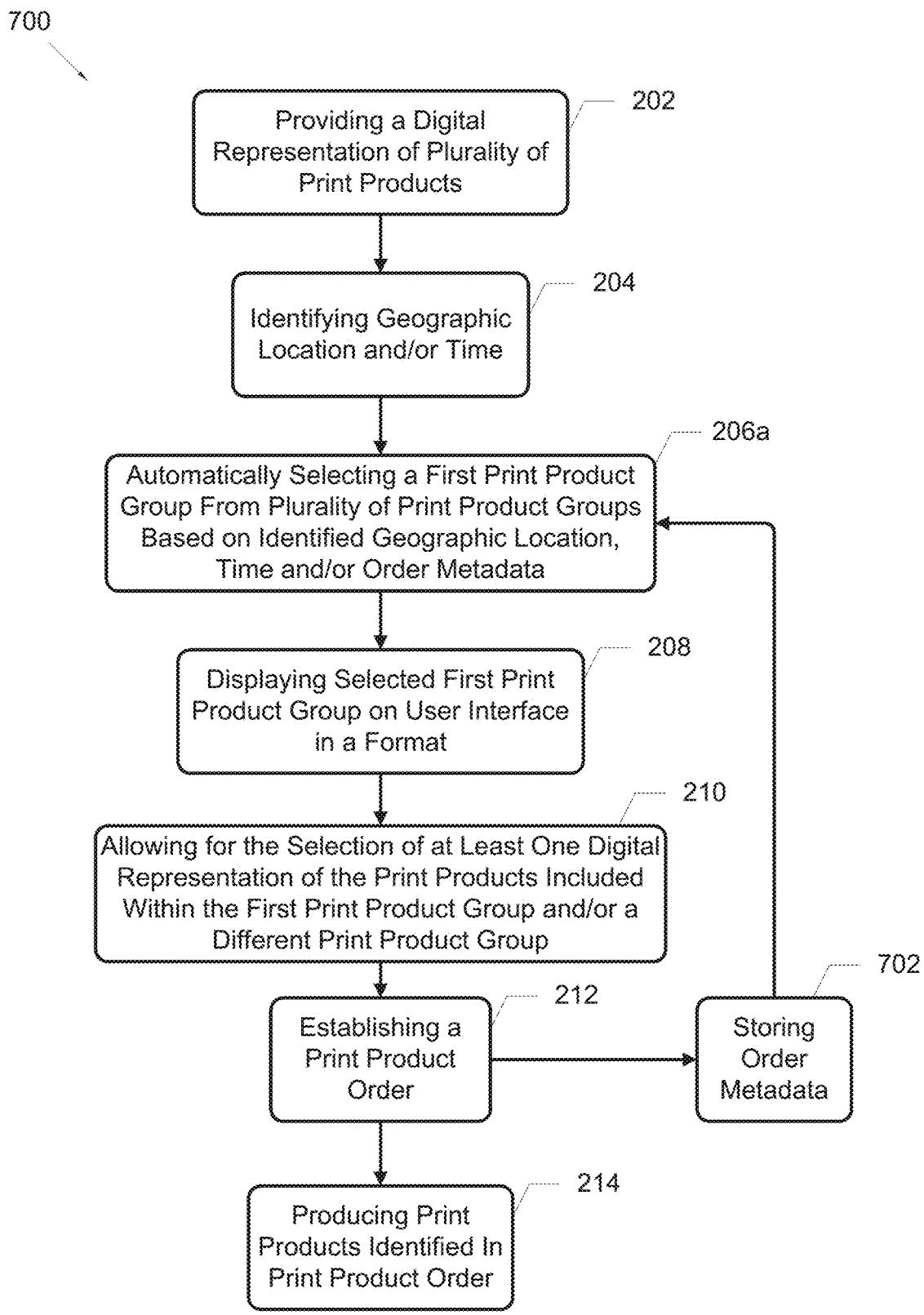
FIG. 7 is a flow diagram showing another embodiment of a method for dynamically displaying digital representations of print products on a user interface of a computing device.

FIG. 7 is a flow diagram of a method 700, which includes many of the same steps 202-214 described above in method 200. However, after the print product order is established, method 700 further includes storing the order metadata in association with a particular user as user analytic data in memory 120 at step 702, which allows product recommender module 106 to utilize the order metadata in a subsequent implementation of method 700 to automatically select a print product group from the plurality of print product groups based on geographic location, time, and/or the stored order metadata at step 206a. For instance, method 700 allows for the selection of a print product group from the plurality of print product groups to be based on the print products that the particular user previously purchased so that the same or similar print products can be displayed to the user again, assuming that user 115 will once again be interested in purchasing the same or similar print products. Also, taking the price of the previously purchased print product into consideration in selecting a print product group from the plurality of print product groups will allow for similarly priced items to be subsequently displayed to user 115. This assumes that user 115 would be more likely to purchase items in a similar price range to a previously purchased product rather than displaying print products that are too far outside a certain price threshold. Thus, method 700 allows product recommender module 106 to take into consideration usage analytic data, such as the order metadata, to further customize the print products that are displayed to user 115.

Figure 8:
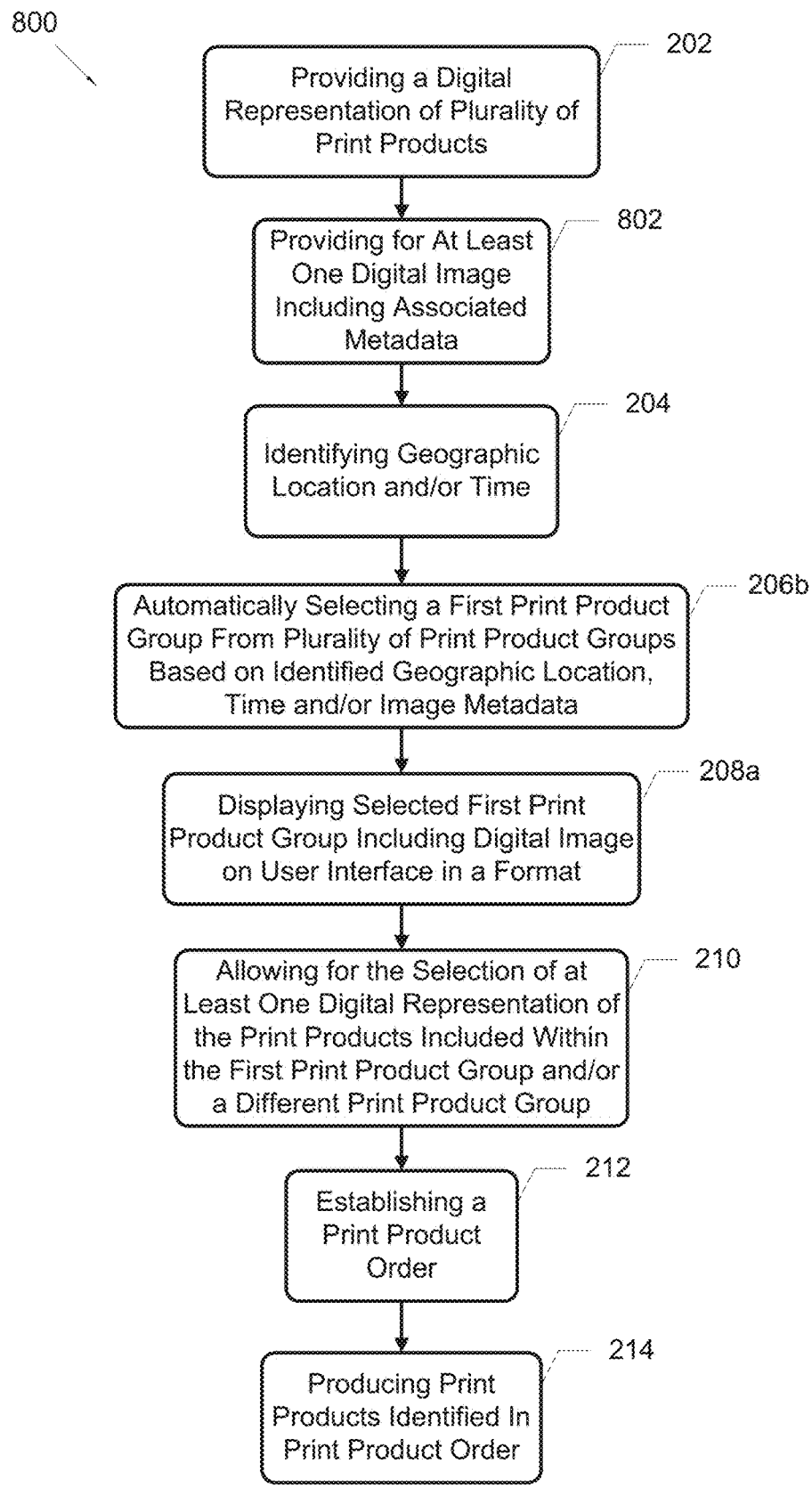
FIG. 8 is a flow diagram showing yet another embodiment of a method for dynamically displaying digital representations of print products on a user interface of a computing device.
Figure 9:
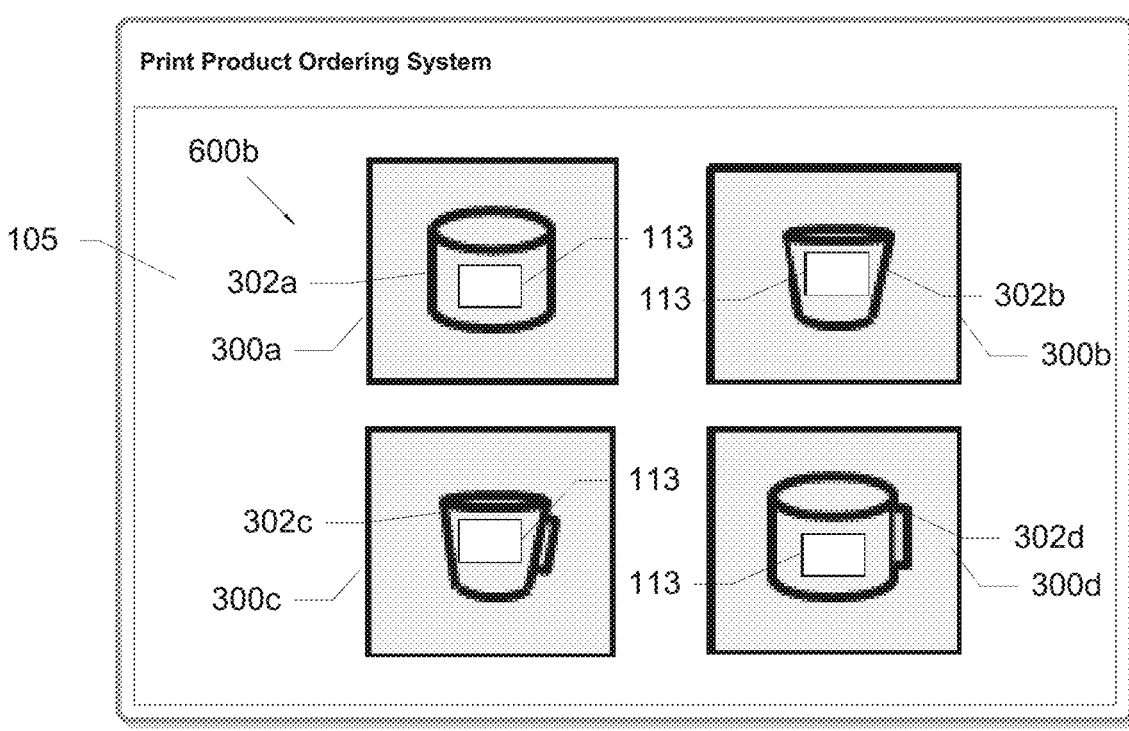
FIG. 9 is an exemplary screen shot of a user interface showing digital representations of a print product in an enlarged format.

FIG. 8 is a flow diagram of a method 800, which includes many of the same steps 202-214 described above in method 200, and could also include the additional steps in method 700. Method 800 further provides for at least one digital image, at step 802. The digital image may be in the form of a file that is stored in a memory of kiosk 102 or in memory 108 in server 110. The digital image may be stored in the aforementioned memory locations prior to user 115 interacting with kiosk 102 for use in method 800, or provided to the aforementioned memory locations by user 115 with a portable memory device, such as a thumb drive, by external computing device through network 112, or from an external memory storage location, such as a third party social networking website or server. User 115 may upload one or more digital images to kiosk 102 for the purpose of previewing how the digital image will look when associated with the selected print products, prior to actually ordering a selected print product using product fulfillment module 122. Thus, As best seen in FIGS. 8 and 9, method 800 may further include displaying the at least one digital image 113 in association with each of the digital representations 300a-d corresponding to the plurality of print products 302a-d included within the first print product group that are displayed on user interface 105, at step 208a.

It should be understood that each digital image also may include image metadata that is stored in association with the digital image, which may provide additional information to tailor the print products that are displayed on user interface 105 of kiosk 102. For instance, image metadata may include information related to at least one of: (i) a source of the at least one digital image, such as the computing device that transferred the digital image to kiosk 102; (ii) a size of a file associated with the at least one digital image; (iii) a resolution of the digital image; (iv) an identification of the digital representations that the at least one digital image was associated with during previous implementations of method 200b; (v) a date that the file associated with the at least one digital image was created, which could correspond with a time of year; (vi) an identification of a device that created the file, such as the make and model of the digital camera or smartphone; or (vii) an identification of at least one item of interest included in the at least one digital image. In one aspect, the item of interest may related to a scene depicted in the at least one digital image. For example, the scene can be at least one of an indoor scene, an outdoor scene, a particular season of the year, or an identifiable landmark. In another aspect, the at least one item of interest may include an identification of whether the at least one item of interest is a human or an animal, and a further determination of an age and a gender of the at least one item of interest. The aforementioned identification of at least one item of interest may be generated by an image recognition module, either provided in system 100 or by some other application program, and provided as image metadata as set forth herein.

The above-referenced image metadata can be used to further enhance the ability of product recommender module 108 to dynamically display digital representations of print products to user 115 of kiosk 102 using the specific characteristics of the image metadata associated with the digital images that are provided by user 115, to present the with print products that are more tailored for user 115 than just randomly displaying print products or solely relying on user 115 to manually select print products. Thus, as best seen in FIG. 8 and in accordance with an aspect of the present invention, the image metadata for the provided at least one digital image may be used by recommender module 106 to automatically select first print product group 400a from the plurality of print product groups based on the identified geographic location, the identified time of year, and/or the associated image metadata at step 206b. This not only provides for a display of print products based on geographic location and time, which do not necessarily need to be directly related to user 115, but also the image metadata that could provide a more individualized presentation of relevant print products to user 115. It will be understood that the remaining steps of method 800 may be similar those described with reference to method 200 or 700.

Figure 10:
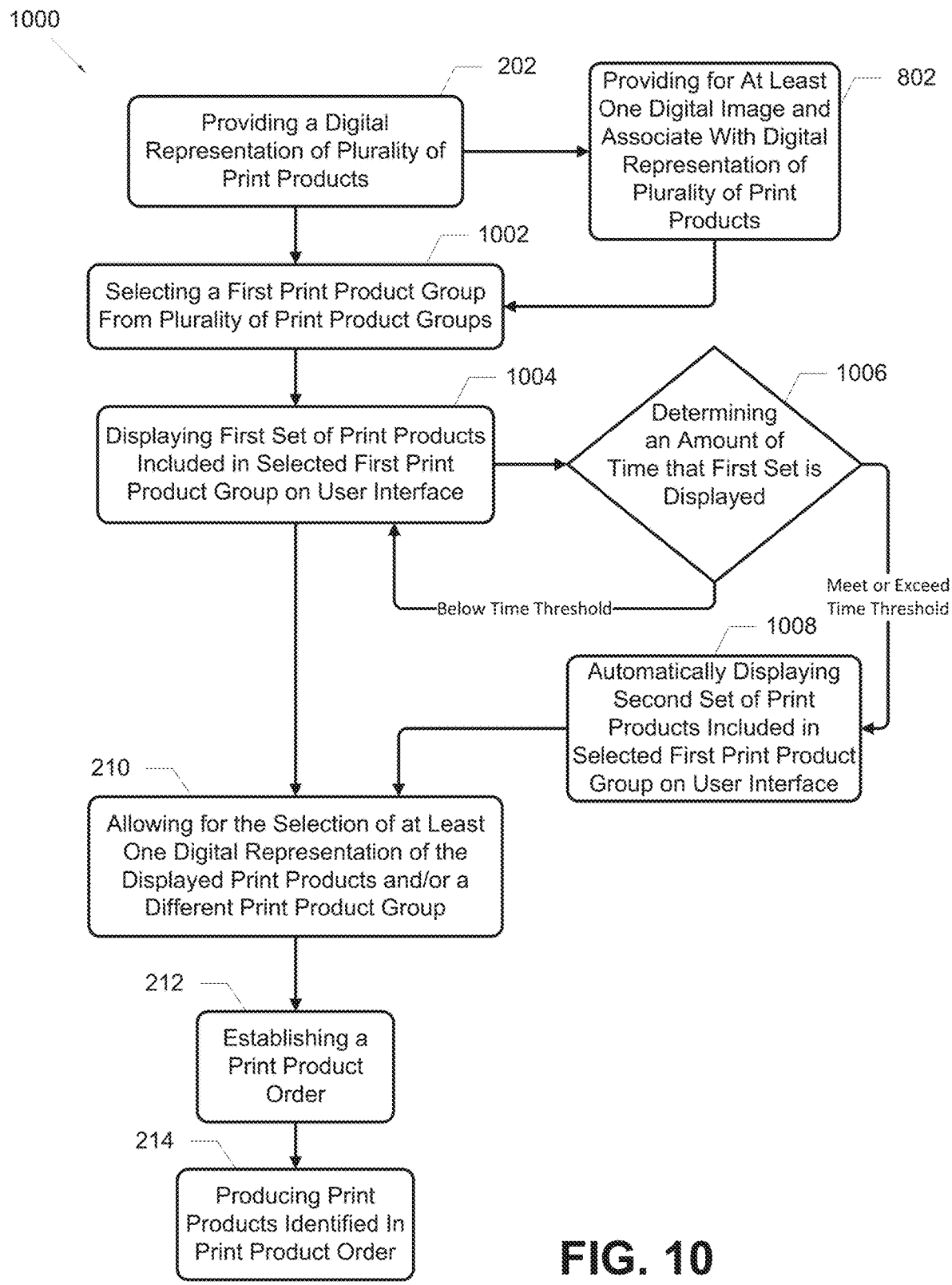
FIG. 10 is a flow diagram showing another embodiment of a method for dynamically displaying digital representations of print products on a user interface of a computing device.

In another aspects, the present invention allows for the collection of information related to the user's interaction with the digital representations of the print products that are displayed on user interface 105, and displays a different set or group of digital representations of print products on user interface 105 for consideration by user 115. For example, as best seen in FIG. 10, a method 1000 includes providing a digital representation of each of a plurality of print products stored in memory of kiosk 102 or memory 108 of server 110, at step 202. Method 1000 may also include the step 802 of providing for at least one digital image 113, and associating digital image 113 with the digital representations of the print product, as described with respect to method 800. Next, first print product group 400a is selected from the plurality of print product groups 400 using a processor and user interface 105 of kiosk 102, at step 1002. The selection of first print product group 400a at step 1002 may be performed manually by user 115 interacting with user interface 105, or automatically as described with respect to steps 206, 206a, 206b using product recommender model 106. Method 1000 further includes displaying digital representations 300a, 300d corresponding to first set 402 of print products included within first print product group 400a on user interface 105 at step 1004. The display of first set 402 of print products may also include the display of the at least one digital images 113 in association therewith, as previously described in step 208a. At step 1006, product recommended module 106 is configured to determine an amount of time that digital representations 300a, 300d corresponding to first set 402 are displayed on user interface 105. If the determined amount of time is equal to or greater than a predetermined time threshold, then product recommender module 106 is configured for automatically displaying digital representations 300b, 300c corresponding to second set 404 of print products included within first print product group 400a on user interface 105 at step 1008. Reaching or exceeding the predetermined time threshold implies that user 115 is interested in a particular product group because user 115 has reviewed the displayed print products for a significant period of time, which could be valuable information to utilize for the current interaction of method 1000 for the specific user. As such, recommender module 106 may be used to display additional products from a particular print product group if it is determined that user 115 has spent at least a certain amount of time reviewing other products included in the print product group, which provides user 115 with additional recommended products within the same print product group. Further, when a predetermined time threshold has been reached for a displayed print product or a particular set of print products, these print products may be identified and stored as usage analytic data in memory 120 in association with user 115. This stored analytic data may be used by recommender module 106 in subsequent interactions with user 115 in the implementation any of the methods described herein. If the determined amount of time is less than the predetermined time threshold and the first set of print products continues to be displayed at step 1004, then method 1000 thereafter allows for the selection of at least one of the displayed digital representations of the print products using user interface 105, establishment of a print product order, and the production of the print product identified in the print product order, as described above with respect to steps 210, 212, 214.

Figure 11:
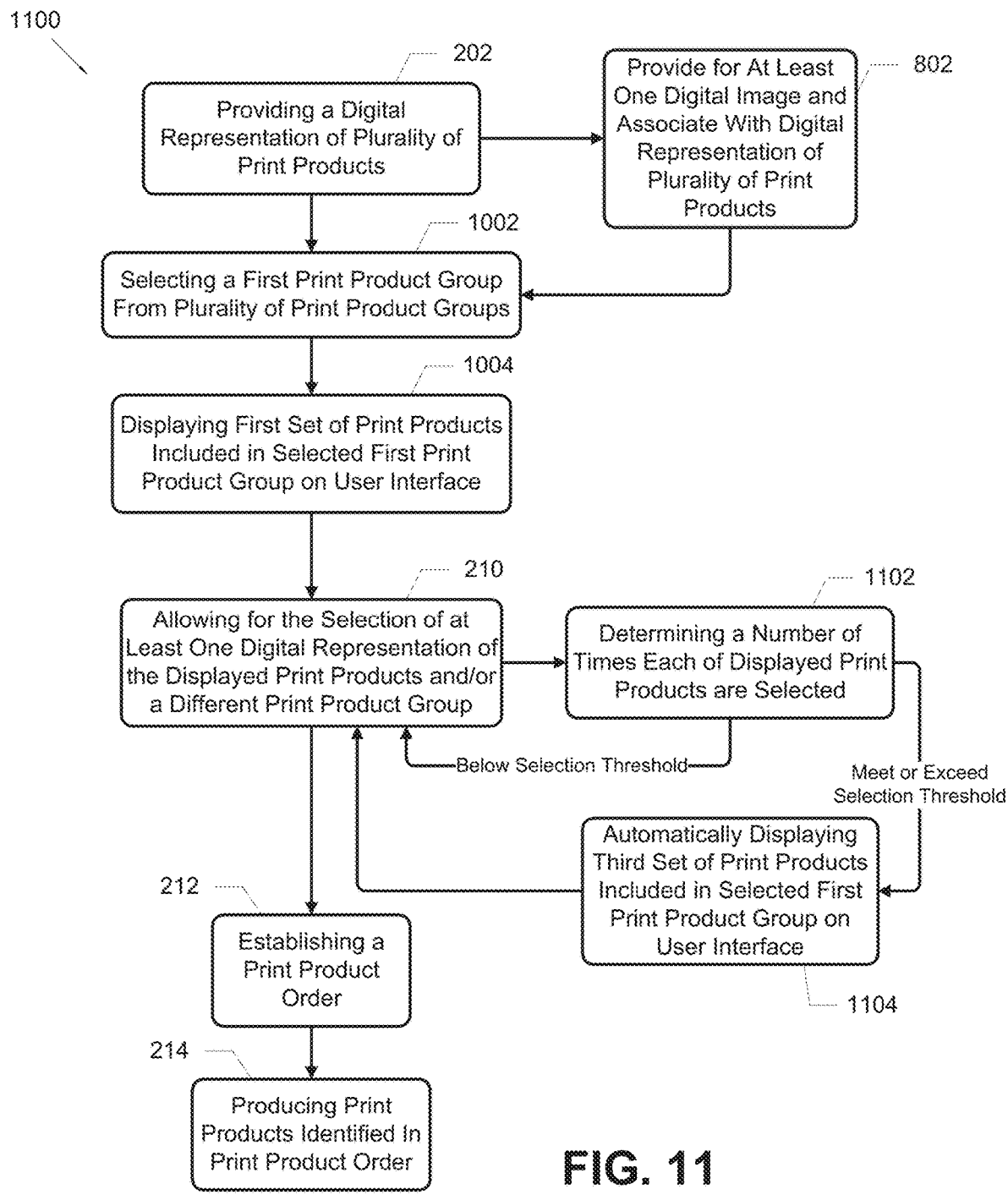
FIG. 11 is a flow diagram showing yet another embodiment of a method for dynamically displaying digital representations of print products on a user interface of a computing device.

In another aspect, the present invention is capable of dynamically determining and changing the type of print products that are displayed to user 115 by keeping track of the number of times that user 115 interacts with a displayed print product or print product group. For example, as best seen in FIG. 11, a method 1100 includes providing a digital representation of each of a plurality of print products stored in memory of kiosk 102 or memory 108 of server 110, at step 202. Method 1100 may also include the step 802 of providing for at least one digital image 113, and associating digital image 113 with the digital representations of the print product, as described with respect to methods 800, 1000. Next, first print product group 400a is selected from the plurality of print product groups 400 using a processor and user interface 105 of kiosk 102, at step 1002. The selection of first print product group 400a at step 1002 may be performed manually by user 115 interacting with user interface 105, or automatically as described with respect to steps 206, 206a, 206b using product recommender model 106. Method 1100 further includes displaying digital representations 300a, 300d corresponding to first set 402 of print products included within first print product group 400a on user interface 105 at step 1004. The display of first set 402 of print products may also include the display of the at least one digital images 113 in association therewith, as previously described. It should be understood that method 1100 allows user 115 to select any of the displayed digital representations using user interface 105 to view product information related to the selected digital representation at step 210, which may include a price for fulfillment of the print product and/or a written description of the selected digital representation. At step 1102, product recommended module 106 is configured to calculate or otherwise determine a number of times that user 115 selects each of the displayed digital representations 300a, 300d. If the number of times for any of the displayed digital representations is equal to or greater than a predetermined selection threshold, then recommender module 106 is configured for automatically displaying one or more digital representations 300j corresponding to a third set 406 (FIG. 4) of print products included within the first print product group on user interface 105 of kiosk 102, at step 1104. Third set 406 of print products includes print products that are similar to or related to the print product that was selected at or above the predetermined selection threshold, and it should be understood that the third set of print products may include one or more of the print products included in the first set of print products. For instance, if user 115 interacts with a particular print product (i.e., coffee mug) four times within a given time frame, which may span over a given session, day, a number of days, or some other time period, then this is an implication that user 115 has an interest in coffee mugs, and recommender module 106 would operate to automatically display additional coffee mugs on user interface 105 for consideration by user 115. Reaching or exceeding the predetermined selection threshold implies that user 115 is interested in a particular print product because user 115 has selected the displayed print product a number of times, which could be valuable information to utilize for the current interaction of method 1100 for the specific user. As such, recommender module 106 may be used to display similar print products if it is determined that user 115 has selected a digital representation of a print product a certain amount of time. Further, when a predetermined selection threshold has been reached for one or more of the displayed print products, these print products may be identified and stored as usage analytic data in memory 120 in association with user 115. This stored analytic data may be used by recommender module 106 in subsequent interactions with user 115 in the implementation any of the methods described herein. If the predetermined selection threshold has not been reached at step 1102 for any of the print products displayed to user 115, then method 1100 continues to allow for the selection of at least one of the displayed digital representations of the print products using user interface 105, establishment of a print product order, and the production of the print product identified in the print product order, as described above with respect to steps 212, 214.

Figure 12:
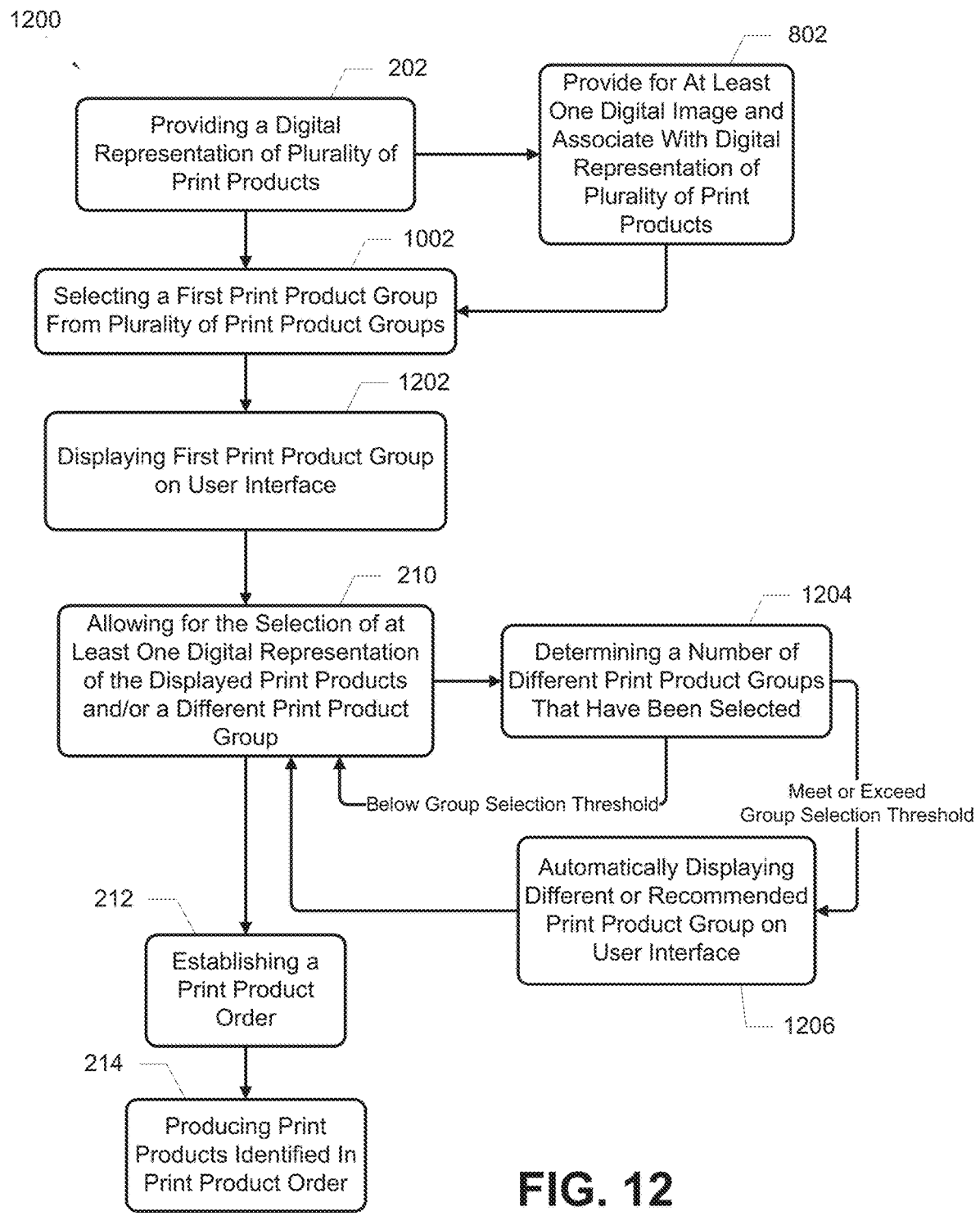
FIG. 12 is a flow diagram showing another embodiment of a method for dynamically displaying digital representations of print products on a user interface of a computing device.

In yet another aspect, the present invention is capable of dynamically determining and changing the type of print products that are displayed to user 115 by keeping track of the number of times that user 115 has selected different print product groups displayed on user interface 105 of kiosk. If a user is selecting different product groups, there is an implication that user 115 doesn't know what type of print product to select. As such, a method is provided that detects when user 115 is selecting multiple print product groups and thereafter automatically displays a recommended print product group to user 115 on user interface 105. For example, as best seen in FIG. 12, a method 1200 includes providing a digital representation of each of a plurality of print products stored in memory of kiosk 102 or memory 108 of server 110, at step 202. Method 1200 may also include the step 802 of providing for at least one digital image 113, and associating digital image 113 with the digital representations of the print product, as described with respect to method 800. Next, first print product group 400a is selected from the plurality of print product groups 400 using a processor and user interface 105 of kiosk 102, at step 1002. The selection of first print product group 400a at step 206c may be performed manually by user 115 interacting with user interface 105, or automatically as described with respect to steps 206, 206a, 206b using product recommender model 106. Method 1200 further includes displaying digital representations 300a-d corresponding to first print product group 400a on user interface 105 at step 1202. The display of first print product group 400a may also include the display of the at least one digital images 113 in association therewith, as previously described. Method 1200 further allows user 115 to select any of the displayed digital representations in first print product group 400a and/or select another print product group, such as, for example, second print product group 400b or a first set 408 (FIG. 4) of digital representations 300e-f within second print product group, at step 210. At step 1204, product recommended module 106 is configured to calculate or otherwise determine a number of times that different print product groups have been selected by user 115 through user interface 105. If the number of times that different print product groups have been selected is equal to or greater than a predetermined group selection threshold, then recommender module 106 is configured for automatically displaying digital representations 300g-i corresponding to a different or recommended print product group, such as third print product group 400c on user interface 105 of kiosk 402, at step 1206. Third print product group 400c may include digital representations of one or more print products that are different than the print products previously displayed in first and second print product groups 400a, 400b, and it should be understood that third print product group 400c may include one or more digital representations of print products included in the first or second print product groups 400a, 400b. In other words, there may be overlap in the print products displayed in each of the print product groups 400a-c. For example, in implementing method 1200, if user 115 selects first print product group 400a to be displayed and then selects second print product group 400b to be displayed, if the predetermined group selection threshold is two, then product recommender module is configured to automatically display a different or recommended print product group, such as third print product group 400c for display on user interface 105. Reaching or exceeding the predetermined group selection threshold implies that user 115 is not looking for a specific print product because user 115 has selected and viewed disparate print products. When a predetermined group selection threshold has been reached during a particular session by user 115, this instance can be stored as usage analytic data in memory 120 in association with user 115. This stored analytic data may be used by recommender module 106 in subsequent interactions with user 115 in the implementation any of the methods described herein, perhaps to providing product recommender module 106 with an indication that a variety of products should be displayed to user 115 the next time user 115 utilizes kiosk 102. If the predetermined group selection threshold has not been reached at step 1204, then method 1200 continues to allow for the selection of at least one of the displayed digital representations of the print products using user interface 105 or a different print product group at step 210, establishment of a print product order, and the production of the print product identified in the print product order, as described above with respect to steps 212, 214.

It is also another aspect of the invention to monitor and store any information related to user 115 interacting with publically available social media through network 112. For example, system 100 may allow user 115 to obtain digital images 113 from a third party social media website through network 112 for use with the aforementioned methods. While user 115 is accessing social media website, recommender module 106 is configured for gathering available information from the social media website to determine what print products should be displayed and recommended to user 115 through kiosk 102. Perhaps recommender module 106 determines that user 115 has a number of digital images displayed on social media website that relate to animals. In this case, recommender module 106 may store this information in associate with this user 115 in memory 120 and display digital representations of print products that relate to animals.

As can be seen from the above-referenced discussion of the operation of system 100 and associated methods 200, 700, 800, 1000, 1100 and 1200, the different aspects of the present invention provide for a number of advantages in that information related to the current usage of print product ordering system 104 based on the user's interaction with the displayed print products, information related to the previous usage and interaction with the displayed print products by a user, users interaction with the displayed print products or publically available social media, as well as other information, such as a geographic location of kiosk 102, a geographic location inputted by a user, a determined or inputted time, order metadata, and/or image metadata may be used for dynamically displaying digital representations of print products and any associated digital images to present the user with relevant and desirable print products. All of the aforementioned information and data is stored by server 110 for each specific user so the methods may be implemented in a customized and personalized manner. These aspects not only allow for print product ordering system 104 to be used in a more efficient manner, but also provides the opportunity to generate more revenue by selling and fulfilling more print products.

It should be understood that all of the steps set forth in methods 200, 700, 800, 1000, 1100 and 1200 as described above may be combined or implemented in any manner and used by system 100 to realize the advantages provided by the aspects of the invention described above.

Having described the exemplary system and exemplary method of the present invention, an exemplary computer environment for implementing the described design and execution is presented next.

Figure 13:
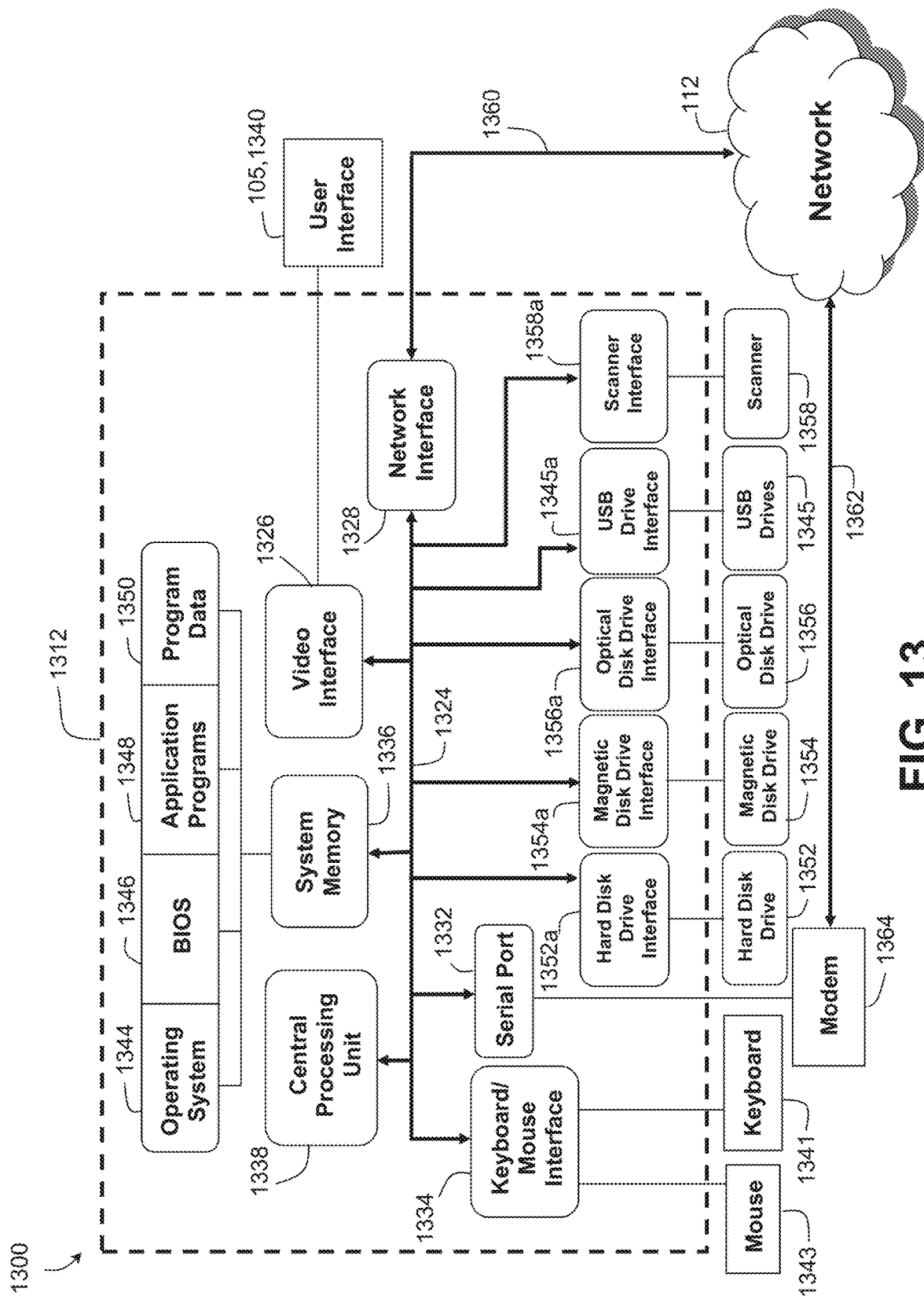
FIG. 13 is a block diagram generally illustrating a computing environment in which the invention may be implemented.

FIG. 13 shows the components of an exemplary computing environment 1300 that may be used to implement any of the methods and processing thus far described. Computing environment 1300 may include one or more computers 1312 (such as, for example, computing devices 102, 110, 114, 126) comprising a system bus 1324 that couples a video interface 1326, network interface 1328, a keyboard/mouse interface 1334, and a system memory 1336 (such as memory 108, 116, 118, 120) to a Central Processing Unit (CPU) 1338. A monitor or display 1340, such as user interface 105, is connected to bus 1324 by video interface 1326 and provides user 115 with a graphical user interface to view digital representations 300 of print products 302 and digital images 113, prepare and edit print product orders, as described above. The graphical user interface allows user 115 to enter commands and information into computer 1312 using a keyboard 1341 and a user interface selection device 1343, such as a mouse, touch screen, or other pointing device. Keyboard 1341 and user interface selection device are connected to bus 1324 through keyboard/mouse interface 1334. The display 1340 and user interface selection device 1343 are used in combination to form the graphical user interface which allows user 115 to implement at least a portion of the present invention. Other peripheral devices may be connected to the remote computer through a wireless connections (e.g., BLUETOOTH or similar methods) and wired connections (e.g., universal serial bus (USB) drives 1345) to transfer information to and from computer 1312. For example, smartphones, cameras and camcorders may be connected to computer 1312 through serial port 1332 or USB drives 1345 so that digital images 113 may be downloaded to memory 1336 (such as memory 118) or another memory storage device, associated with computer 1312 such that digital images 113 and print product may be subsequently printed by photofinishing device 126.

The system memory 1336 is also connected to bus 1324 and may include read only memory (ROM), random access memory (RAM), an operating system 1344, a basic input/output system (BIOS) 1346, application programs 1348 and program data 1350. The computer 1312 may further include a hard disk drive 1352 for reading from and writing to a hard disk, a magnetic disk drive 1354 for reading from and writing to a removable magnetic disk (e.g., floppy disk), and an optical disk drive 1356 for reading from and writing to a removable optical disk (e.g., CD ROM or other optical media). The computer 1312 may also include USB drives 1345 and other types of drives for reading from and writing to flash memory devices (e.g., compact flash, memory stick/PRO and DUO, SD card, multimedia card, smart media xD card), and a scanner 1358 for scanning items such as still image photographs to be downloaded to computer 1312. A hard disk drive interface 1352a, magnetic disk drive interface 1354a, an optical drive interface 1356a, a USB drive interface 1345a, and a scanner interface 1358a operate to connect bus 1324 to hard disk drive 1352, magnetic disk drive 1354, optical disk drive 1356, USB drive 1345 and scanner 1358, respectively. Each of these drive components and their associated computer-readable media may provide computer 1312 with non-volatile storage of computer-readable instruction, program modules, data structures, application programs, an operating system, and other data for computer 1312. In addition, it will be understood that computer 1312 may also utilize other types of computer-readable media in addition to those types set forth herein, such as digital video disks, random access memory, read only memory, other types of flash memory cards, magnetic cassettes, and the like.

Computer 1312 may operate in a networked environment using logical connections with network 112. Network interface 1328 provides a communication path 1360 between bus 1324 and network 112, which allows, for example, usage analytic data to be communicated to and from to memory 120 or print product orders to be communicated to photofinishing system 124. The print product order, for example, may also be communicated from bus 1324 through a communication path 1362 to network 112 using serial port 1332 and a modem 1364. It will be appreciated that the network connections shown herein are merely exemplary, and it is within the scope of the present invention to use other types of network connections between computer 1312 and network 112 including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A computer-implemented method programmed for execution in a computing environment for dynamically displaying a digital representation of one or more recommended print products on a user interface of a computing device for review and selection by a user, the method comprising:
  a) providing a digital representation of each of a plurality of print products stored in a computer memory, wherein the plurality of print products are categorized into at least one of a plurality of print product groups, wherein the plurality of print product groups includes a first print product group, wherein the print products included in the first print product group are associated with a particular time of year;
  b) identifying a current time of year using a processor of a computing device;
  c) if the particular time of year associated with the first print product group corresponds with the identified current time of year, automatically selecting the first print product group from the plurality of print product groups using the processor of the computing device; and d) displaying the digital representations corresponding to at least one of the plurality of print products included within the selected first print product group on a user interface of the computing device.

2. A method in accordance with claim 1, wherein the time of year is one of a day, month, year, or season.

3. A method in accordance with claim 1, further comprising the steps of:
providing for at least one digital image; and
displaying the at least one digital image in association with each of the digital representations corresponding to the at least one of the plurality of print products included within the first print product group that are displayed on the user interface.

4. A method in accordance with claim 3, wherein the step of providing the at least one digital image includes storing the at least one digital image in the computer memory.

5. A method in accordance with claim 4, wherein the computer memory is either provided by the computing device, or provided by a server that is in communication with the computing device over a network.

6. A method in accordance with claim 5, wherein the at least one digital image is stored in the computer memory using an external computing device that is in communication with the computing device or the server over the network.

7. A method in accordance with claim 6, wherein the external computing device is one of a mobile computing device or a remote computing device.

8. A method in accordance with claim 7, wherein the network is one of a wired network or a wireless network.

9. A method in accordance with claim 4, wherein the at least one digital image includes associated metadata that is stored in the computer memory.

10. A method in accordance with claim 3, wherein the at least one digital image includes associated metadata, and wherein the step of selecting the first print product group from the plurality of print product groups using the processor of the computing device is based on the identified time of year or the associated metadata.

11. A method in accordance with claim 1, further comprising the steps of:
allowing for the selection of at least one of the displayed digital representations corresponding to the at least one of the plurality of print products included within the first print product group; and
establishing a print product order using the processor, wherein the print product order includes the selected digital representations corresponding to the at least one of the plurality of print products included within the first print product group.

12. A method in accordance with claim 11, further comprising the step of:
producing a print product corresponding to the selected digital representations included within the print product order.

13. A method in accordance with claim 11, wherein the print product order includes order metadata, wherein steps a)-d) are repeated, and wherein the subsequent selecting of the first print product group is at least in part based on the order metadata.

14. A method in accordance with claim 13, wherein the order metadata includes at least one of:

an identification of the at least one digital representations corresponding to the selected digital representations included within the print product order; or
a price of the selected digital representations included within the print product order.

15. A non-transitory computer-readable medium having thereon computer-executable instructions for performing a method for dynamically displaying a digital representation of one or more recommended print products on a user interface of a computing device for review and selection by a user, the method comprising:

a) providing a digital representation of each of a plurality of print products stored in a computer memory, wherein the plurality of print products are categorized into at least one of a plurality of print product groups, wherein the plurality of print product groups includes a first print product group, wherein the print products included in the first print product group are associated with a particular time of year;

b) identifying a current time of year using a processor of a computing device;

c) if the particular time of year associated with the first print product group corresponds with the identified current time of year, automatically selecting the first print product group from the plurality of print product groups using the processor of the computing device; and d) displaying the digital representations corresponding to at least one of the plurality of print products included within the selected first print product group on a user interface of the computing device.

16. A computer system for dynamically displaying a digital representation of one or more recommended print products, the system comprising:

a computer memory having a print product recommendation module and a digital representation of each of a plurality of print products stored in the computer memory, wherein the print product module allows for the identification of a current time of year, wherein the plurality of print products are categorized into at least one of a plurality of print product groups, wherein the plurality of print product groups includes a first print product group, wherein the print products included in the first print product group are associated with a particular time of year;

a processor configured for being used in conjunction with the print product recommendation module to automatically select the first print product group from the plurality of print product groups if the particular time of year associated with the first print product group corresponds with an identified current time of year; and a user interface configured for displaying the selected digital representations corresponding to at least one of the plurality of print products included within the selected first print product group.

17. A system in accordance with claim 16, further comprising:
at least one digital image,
wherein the user interface is configured for displaying the at least one digital image in association with each of the digital representations corresponding to the at least one of the plurality of print products included within the first print product group that are displayed on the user interface.

18. A system in accordance with claim 17, wherein the at least one digital image is stored in the computer memory.

19. A system in accordance with claim 18, wherein the computer memory is a server that is in communication with the processor and the user interface over a network.

20. A system in accordance with claim 19, wherein the at least one digital image is stored in the computer memory using an external computing device that is in communication with the server over the network.

21. A system in accordance with claim 17, wherein the at least one digital image includes associated metadata, and wherein the automatic selection of the first print product group from the plurality of print product groups using the processor of the computing device is based on the identified time of year or the associated metadata.

22. A system in accordance with claim 16, wherein the user interface is configured to allow for the selection of at least one of the displayed digital representations corresponding to the at least one of the plurality of print products included within the first print product group, and wherein the processor is configured to establish a print product order, and wherein the print product order includes the selected digital representations corresponding to the at least one of the plurality of print products included within the first print product group.

23. A non-transitory computer readable medium in accordance with claim 15, whereon the method further comprises:
   providing for at least one digital image; and
   displaying the at least one digital image in association with each of the digital representations corresponding to the at least one of the plurality of print products included within the first print product group that are displayed on the user interface.

24. A non-transitory computer readable medium in accordance with claim 23, wherein the step of providing the at least one digital image includes storing the at least one digital image in the computer memory.

25. A non-transitory computer readable medium in accordance with claim 24, wherein the computer memory is either provided by the computing device, or provided by a server that is in communication with the computing device over a network.

26. A non-transitory computer readable medium in accordance with claim 25, wherein the at least one digital image is stored in the computer memory using an external computing device that is in communication with the computing device or the server over the network.

27. A non-transitory computer readable medium in accordance with claim 23, wherein the at least one digital image includes associated metadata, and wherein the step of selecting the first print product group from the plurality of print product groups using the processor of the computing device is based on the identified time of year or the associated metadata.

28. A non-transitory computer readable medium in accordance with claim 15, wherein the method further comprises:
   allowing for the selection of at least one of the displayed digital representations corresponding to the at least one of the plurality of print products included within the first print product group; and
   establishing a print product order using the processor, wherein the print product order includes the selected digital representations corresponding to the at least one of the plurality of print products included within the first print product group.

29. A non-transitory computer readable medium in accordance with claim 28, wherein the print product order includes order metadata, wherein steps a)-d) are repeated, and wherein the subsequent selecting of the first print product group is at least in part based on the order metadata.

30. A non-transitory computer readable medium in accordance with claim 29, wherein the order metadata includes at least one of:
   an identification of the at least one digital representations corresponding to the selected digital representations included within the print product order; or
   a price of the selected digital representations included within the print product order.

\* \* \* \* \*